INVENTOR
CHARLES G. HEISIG
BY Thomas J. O'Brien
ATTORNEY

Jan. 20, 1959  C. G. HEISIG  2,869,358
APPARATUS FOR MEASURING VISCOSITY
Filed Feb. 21, 1957  3 Sheets-Sheet 2

INVENTOR
CHARLES G. HEISIG
BY
ATTORNEY

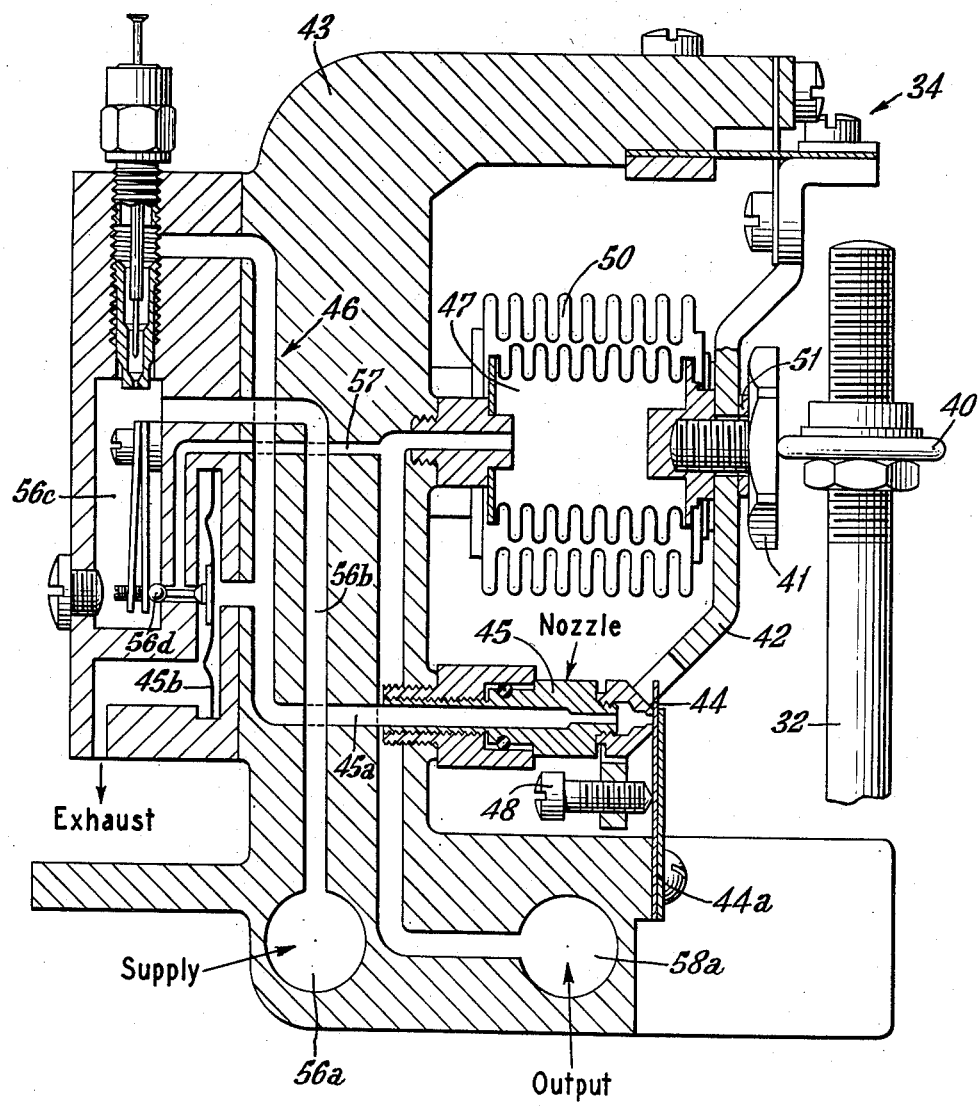

2,869,358

APPARATUS FOR MEASURING VISCOSITY

Charles G. Heisig, Ann Arbor, Mich., assignor to Union Carbide Corporation, a corporation of New York Application February 21, 1957, Serial No. 641,647

5 Claims. (Cl. 73—60)

This invention relates to improvements in instruments for measuring viscosity of fluids, either liquids or gases, and more particularly, to improved rotational viscometers for measuring viscosity of a fluid in a moving stream. This invention also relates to apparatus for measuring viscosity of "non-Newtonian fluids." "Newtonian fluids" are by definition those fluids having a constant ratio of shearing stress to rate of shear, or, as it is also known, the rate of shearing strain, for all rates of shear. "Non-Newtonian" fluids are those which do not have a rate of shear which is linearly proportional to shearing stress.

The viscosity of Newtonian fluids, such as alcohol and water, can be determined by a single measurement of shearing stress at any rate of shear, because by definition their viscosity is constant at all rates of shear. However, a single shearing stress measurement does not define the viscous properties of non-Newtonian fluids, such as, for example, complex polymers and printing inks, because at any given temperature the viscosity is not constant at different rates of shear. Consequently, in order to determine or define the rheological properties of a non-Newtonian fluid, it is necessary to know how the fluid reacts at different shear rates. Non-Newtonian fluids flow under stress in one of three principal ways. One type of non-Newtonian fluid, hereinafter referred to as "true non-Newtonian," has a plastic flow in which the rate of shear is proportional to the shearing stress in excess of yield value. A second type, hereinafter called "pseudo-non-Newtonian," has a pseudoplastic flow in which the rate of shear increases faster than linearly with shearing stress. A third type has a dilatant flow in which shearing stress increases faster than linearly with the rate of shear. A fourth type, "thixotropic non-Newtonian," has a shearing stress similar to that of a pseudoplastic in which the rate of shear increases faster than linearly with shearing stress but it also exhibits hysteresis with respect to increasing and decreasing shear rate. Accordingly, in order to measure true viscosity of non-Newtonian it is necessary to determine the entire consistency curve (shearing stress vs. rate of shear strain) for the fluid. This is complicated and difficult to obtain in industrial plants, and it does not present a very practical basis for plant control. However, the general position and the direction of the curve can be established for a normal range of shear rates by measuring shearing stress at two different rates of shear. This has been found sufficient to define the fluid rheologically for most plant control purposes. A "viscosity" value can then be given to a fluid based on the linear relation between shearing stress and rate of shear over limits of the range of shear rates used in the two point measurement. This gives a rheological measurement which defines the fluid more accurately than a single point measurement, which alone cannot define the non-Newtonian viscosity curve.

One type of viscometer used for making the single point and multiple point measurement is the rotational viscometer. The basic components of a rotational viscometer are two concentrically arranged cylindrical members which are spaced radially relative to one another to form an annulus for receiving a fluid to be tested and one of which is rotatable relative to the other. In operation, the rotatable member is rotated and any one of several conditions is measured which is proportional to the viscous forces set up in the fluid by the rotation of the one member relative to the other and which, together with other known conditions, can be correlated to determine the viscosity of the fluid. One of the methods used in determining viscosity of a fluid in a rotational viscometer involves measurement of shearing stress at a given rate of shear. The rate of shear for a given type of fluid is predetermined at a given speed of rotation of the rotated member either mathematically or by calibration of the instrument with a fluid of known viscosity which has flow properties similar to that of the fluid to be tested. Shearing stress can then be measured to determine a single point on the consistency curve for the fluid. For Newtonian fluids, this single point measurement will determine viscosity of the fluid since the definition of the viscosity, or ratio of shearing stress to rate of shear is constant for all rates of shear. However, for non-Newtonians, two or more point measurements must be taken to establish the slope and general position of the consistency curve in a predetermined range of shear rates, from which a "viscosity" value as defined above may be ascertained. For plant control, continuous monitoring is desirable for best results in maintaining uniformity of product. However, none of the viscosity measuring devices of the prior art were found to give swift and accurate viscosity measurements of fluids, especially non-Newtonian fluids, in a continuously flowing stream.

It is therefore an object of the present invention to provide new and useful improvements in viscosity measuring apparatus and particularly in rotational viscometers. More particularly, this invention provides a rotational viscometer for continuously measuring viscosity of a continuously flowing fluid.

Another object of this invention is to provide an improved means for measuring torque developed by viscous forces in a rotational viscometer.

Still another object is to provide novel apparatus for measuring "viscosity" of non-Newtonian fluids. More specifically, this invention provides a new instrument for continuously measuring shearing stress of a flowing fluid at two different rates of shear.

In accordance with the present invention, a rotational viscometer is provided which comprises at least one pair of concentric, cylindrical members which are radially spaced relative to one another to define between them an annular, open passageway through which a fluid to be tested is continuously passed. One of the members is rotated at a constant speed and the other member is mounted to run freely about its axis. The torque transmitted to the other member is a function of the shearing stress developed in the fluid flowing continuously in the annular passageway between the members and it urges the other member in a rotary direction. A force measuring device is positioned to limit movement of the other member and thereby to determine shearing stress. Since the rate of shear was predetermined as discussed above, measurement of shearing stress at this shear rate determines a point on the consistency curve of the fluid, which for Newtonians also determines viscosity. Although the viscometer of the present invention is adapted primarily for measuring viscosity of a flowing stream, it should be apparent that it is also readily adaptable for batch measurements.

For non-Newtonian measurements, the rotational viscometer of this invention is provided with two freely mounted different diameter members concentric with the driven member but in tandem with each other. Fluid is passed continuously and successively through the annuli between the driven member and the respective freely mounted members. Due to the difference in diameters of the freely mounted members, the shear rate in the fluid in each annulus will be different at constant speed rotation of the driven member. By measuring the torques to which each outer member is subjected, two points can be obtained simultaneously on the consistency curve of the fluid and from these points the slope and position of the curve can be determined. From this a "viscosity" value based on the linear relation between shearing stress and shear rate can be determined for a wide range of shear rates.

These and other objects, features and advantages of the invention will become apparent from the following detailed description of the accompanying drawings in which:

Fig. 4 is a vertical transverse section taken along line 4—4 of Fig. 1.

A dual shear rate viscometer according to this invention has been shown which is intended to exemplify a preferred embodiment of this invention. Since the dual shear rate viscometer includes in its organization two components which are substantially single shear rate viscometers, the single shear rate viscometer has not been illustrated separately.

Figure 1:
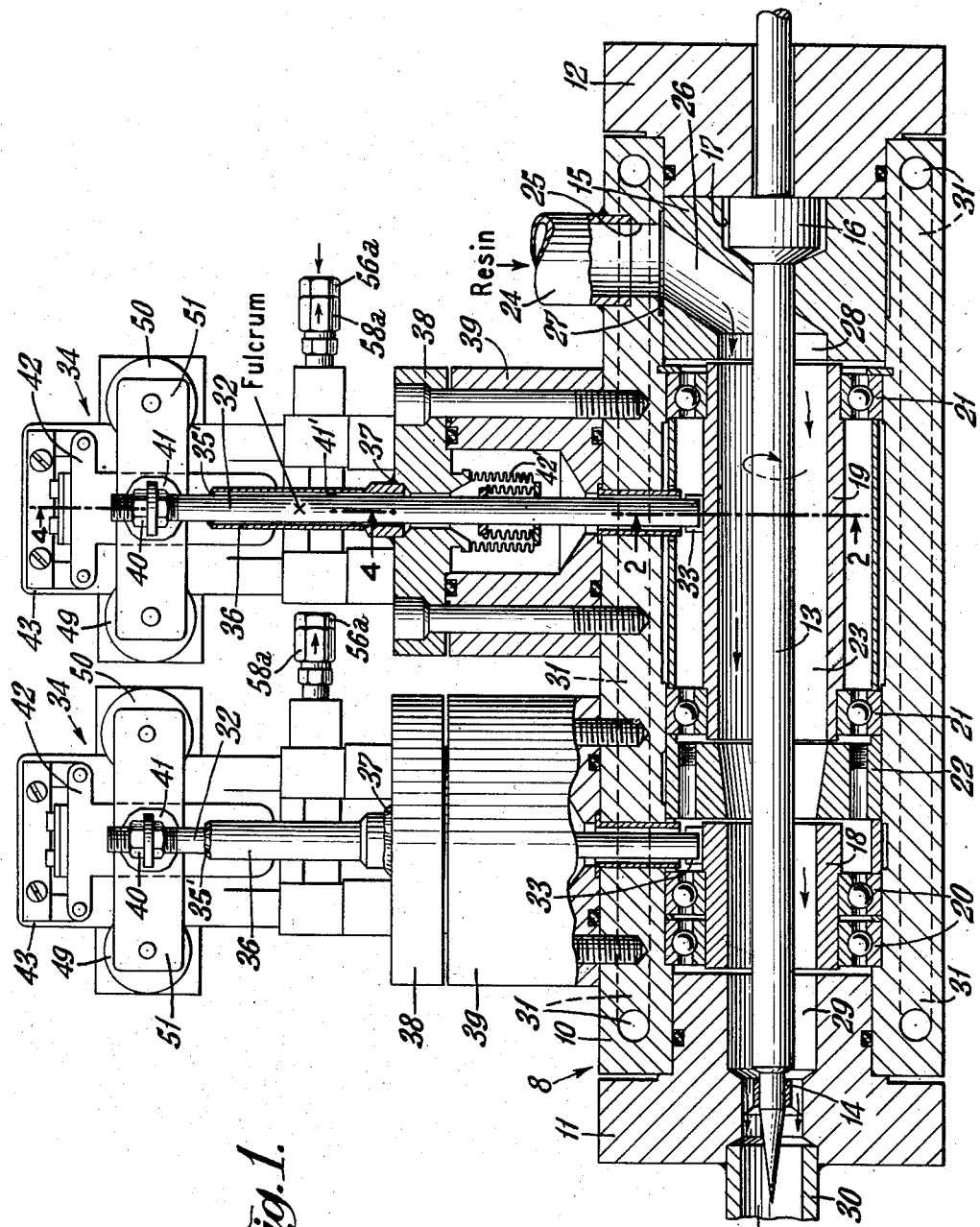
Fig. 1 is a longitudinal cross section through a dual shear rate viscometer according to the present invention, showing the force measuring components at the right hand portion partly in section and partly in elevation.
Figure 2:
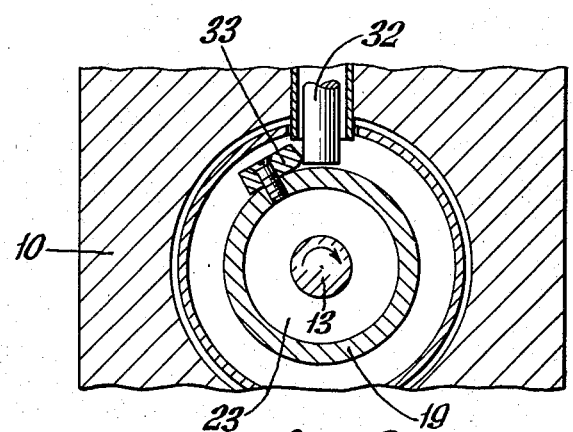
Fig. 2 is a transverse section taken along line 2—2 of Fig. 1.

Referring now particularly to Fig. 1 of the drawings, the dual shear rate viscometer comprises casing 8 made up of three sections 10, 11 and 12, the central section 10 being a hollow cylindrical member in which a motor-driven shaft 13 extends coaxially therethrough, the shaft being journaled forwardly in a spider 14 in section 11 and rearwardly in a fluid distribution block 15. The tapered, forward surfaces of a collar 16 mounted on the rear portion of the shaft 13 engage the tapered bottom wall of a recess 17 in the block to form a rotary seal for preventing leakage of fluid backwardly through casing section 12. Within the central section 10 of the casing, the shaft 13 is surrounded by two axially spaced sleeves 18 and 19 which lie concentric to the shaft in outwardly spaced relation thereto. By the present invention the sleeves 18 and 19 are mounted to run freely in sets of bearings 20 and 21, respectively, and sleeve 19 has an inner diameter which is larger than that of sleeve 18. A non-rotary sleeve 22 extends axially between the sleeves in concentrically spaced relation to the shaft 13 and has an inner diameter that tapers forwardly from an inner diameter the same as sleeve 19 to an inner diameter the same as sleeve 18 at its forward end adjacent sleeve 18. There is thereby formed between the shaft 13 and the outwardly spaced sleeves 18, 19 and 22 an axially extending annular passageway 23 free of sudden cross sectional change and through which fluid to be tested is passed under substantially laminar flow conditions. Passageway 23 also isolates the zones of different shear rates so interaction between zones on the measuring sleeves 18 and 19 is substantially negligible. Fluid is introduced into the viscometer by an inlet conduit 24 which is received into a lateral port 25 in section 10 of the casing. A radial duct 26 in the block 15 communicates at its outer end with such port through an annular recess 27 in casing section 10 and is connected at its inner end into an axially extending duct 28 that opens into the annular passageway 23 between sleeve 19 and shaft 13. The fluid to be passed through the passageway 23 is directed axially by duct 28 prior to entry into the passageway so as to promote laminar flow in the passageway, which is essential for the operation of the viscometer. After traversing passage 23, the fluid being tested passes out of the casing through a central duct 29 in section 11 of the casing and thence into an outlet conduit 30. Circumferentially spaced, axially extending passageways 31 are provided in section 10 of the casing for the circulation of a coolant fluid to keep the fluid in the instrument at a substantially constant temperature during testing.

When fluid is passed through passageway 23 and the shaft is rotated, the viscous forces developed in the liquid exert a torque on the freely mounted sleeves 18 and 19, which causes them to turn about their axes. A force measuring device is provided which limits rotation of the sleeves by developing a reaction torque when abutted by a projection on the sleeve. Since the torque developed is a measure of the shearing stress applied to the fluid and since the shear rate or rate of shearing strain has been predetermined, the torque measured determines a point on the consistency curve of the fluid.

Figure 3:
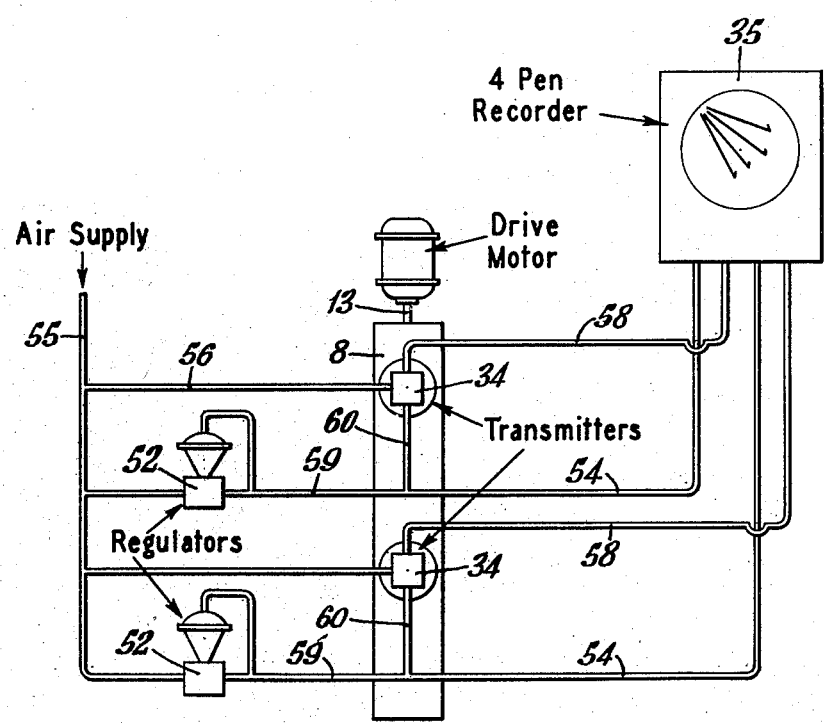
Fig. 3 is a schematic flow diagram of the fluid pressure system used for operating and controlling the force measuring components of the dual rate viscometer of Fig. 1.

A force measuring instrument is provided for each rotatable sleeve 18 and 19. The construction of each force measuring device and its coaction with a sleeve are identical; accordingly, a single detailed description is given of the force measuring device coacting with sleeve 19. The force measuring device comprises a force rod 32 which extends through the section 10 of the casing to a location in the path of rotation of a projection or stop 33 on sleeve 19. Consequently, when a torque is exerted on the sleeve 19 by the viscous forces in the fluid, the sleeve will rotate until stop 33 abuts the end of the force rod 32. The torque applied to the rod 32 is transmitted to a pneumatic relay, indicated at 34, wherein it is amplified and transmitted to a recording instrument 35, as shown in Fig. 3.

The force measuring device shown is a force-balance type pneumatic transmitter; however, any of several force measuring devices could be suitable for the practice of this invention. Force rod 32 is welded, as at 35', near its upper end to a flexure tube 36 which in turn is welded at 37 to a mounting flange 38 that, together with a mounting block 39, is bolted to the casing 8. The flexure tube 36 is a thin-walled tubular spring which serves both as a frictionless pressure seal and as a virtual fulcrum about which the force rod 32 may be considered to pivot. The upper end of the force rod is threaded and has a range adjustment nut 40 which bears against a member 41 on a lever 42 of the pneumatic transmitter 43, and which is adjustable for the entire range of the output of the transmitter. The net movement required at the range nut 40 to give the full output pressure span (i. e. 3–15 p. s. i. g.) of the transmitter is so small (approximately 0.017") that the spring rate of the flexure tube 36 does not materially affect the measurement of the force transmitted by the force rod 32. Since a possibility exists that the temperature of the flexure tube 36 may reach a temperature at which the fluid being tested, particularly resins, would freeze in the annulus 41' between the force rod and the flexure tube and the force rod and the flange 38, and block movement of rod 32, thereby interfering or preventing measurement, expansion bellows 42' is provided so that this annulus can be filled with oil instead of test fluid.

The force rod 32 through the range nut 40 exerts on lever 42 of the transmitter 34 a force exactly proportional to the force exerted by the sleeve 19, through stop 33, on the force rod 32. Any movement of the range nut 40 will be followed by a movement of lever 42 which is pivoted at its upper end on the transmitter block 43 and which acts on a flapper 44 pivoted at 44a to the transmitter so that movement of the lever 42 moves the flapper 44 toward or away from the discharge end of a nozzle 45, which serves as a condition sensing device for a signal output relay 46. The latter is connected, as shown in Figs. 3 and 4, to a source of fluid under pressure by a header 55 and a branch conduit 56 leading to a port 56a in the relay. Supply port 56a is connected to the relay pressure chamber 56c through conduit 56b. The relay serves to supply pressure as needed to an output conduit 57 connected to the pressure chamber 56c and leading to a bellows 47 acting upon lever 42 so as to effect balance of the system. Movement of the flapper 44 changes the air pressure in the nozzle 45 and the pressure change is sensed by the relay 46 through a diaphragm 45b connected to nozzle 45 through conduit 45a. This in turn influences the positioning of output valve 56d attached to the diaphragm and varies the output pressure delivered to the bellows 47 through conduit 57. The pressure delivered to bellows 47 counter-balances the force applied by the force rod 32 on the lever 42. This output pressure delivered to bellows 47 is recorded continuously on a pen recorder 35 which is connected to relay output conduit 57 by conduit 58 leading from port 58a.

Although the output pressure range of the transmitter normally represents a full scale range of viscosity values, the range of viscosity covered by the range of output pressure can be varied to obtain greater sensitivity in recording. For example, if the 3 to 15 p. s. i. g. output pressure range of the transmitter covers a scale of from 0 to 200,000 poises, the zero point can be varied from zero to 92% of full scale viscosity. This is accomplished by the provision of zero suppression bellows 49 and 50 which are connected to header 55 by way of branch conduits 59 and 60 and are disposed between the transmitter block 43 and a transverse bar 51 attached to lever 42. Pressure in the bellows is varied by adjustment of a pressure regulator 52 in conduit 59 to adjust the zeroing of the transmitter to a predetermined percentage of full scale viscosity. The pressure of the zero suppression bellows is also recorded continuously on pen recorder 35 which is pneumatically connected by conduits 54 and 59 with the zero suppression regulator 52. The transmitter 43 is provided with a course zero adjustment in the form of a set screw 48 attached to the lower end of the lever 42.

When the pressures in the bellows 47 and zero suppression bellows 49 and 50 have been determined, the torque on the force rod 32 can easily be determined by summing the moments on lever 42 counterbalancing such torque. This torque is a measurement of shearing stress in the fluid being tested and determines a point on the consistency curve at the predetermined rate of shear at which the torque measurement was taken. The second point on the consistency curve is determined by a measurement of torque developed by the viscous forces in the same fluid at a different shear rate. To this end a second force measuring device records a measurement of the shearing stress applied to the fluid in the annulus between shaft 13 and sleeve 18, which has an inner diameter which is smaller than that of sleeve 19. It can thus be seen that the instrument of this invention provides a simple way of obtaining a two-point measurement of shearing stress at different shear rates, from which accurately definite viscosity of a non-Newtonian fluid can be quickly obtained. The instrument is particularly adapted for plant control work, for it takes fluid from a stream in the production process and leads it by inlet 24 into the open passageway formed by the annuli between the freely mounted sleeves and the rotating shaft and returns the fluid to the same stream by way of the outlet leading from such open passageway. This provides continuous testing of the consistency of the product and thereby permits continuous control to obtain uniformity of product. Return of tested fluid to the process stream also avoids loss in fluid.

It should be apparent that various details of construction can be changed without departing from the spirit of this invention as defined in the appended claims.

What is claimed is:

1. Apparatus for measuring continuously the viscosity of fluid in a continuous stream at a given rate of shear, comprising a casing having a chamber therein, a power-operated rotary cylindrical member extending axially through the chamber and being rotated at a predetermined constant speed, a cylindrical sleeve surrounding said member in concentric, outwardly spaced relation thereto so as to define therewith an axially extending passageway of a predetermined radial dimension, said casing having inlet and outlet means connected with opposite ends of said passageway for passing said stream through said passageway, means mounting said sleeve for at least a limited turning movement in response to the torque applied thereto by the viscous forces developed in the fluid in said passageway under the rotating action of said rotary member, said sleeve having an outwardly projecting abutment, a fulcrumed lever extending radially through the casing into said chamber and having a free end in position to be engaged by said abutment for limiting movement of said sleeve, and means measuring the moment exerted on said sleeve by said lever for establishing the shear stress in said fluid at the known rate of shear.

2. Apparatus for measuring viscosity of non-Newtonian fluid, comprising a first endless rotary cylindrical surface driven at a predetermined constant velocity, two other endless rotary cylindrical surfaces surrounding said first surface and being spaced at different radial distances therefrom, said two surfaces being concentric with said first surface but in tandem with each other so that the annuli formed between the first surface and the respective other surfaces define portions of an annular space in which fluid to be tested is received and subjected to two rates of shear, each of said tandem-arranged surfaces being mounted for at least limiting free rotation relative to said first surface, means engageable with said other surfaces for applying forces thereto equal and opposite to the respective torques exerted on such surfaces by the viscous forces developed in the fluid under the motion of said rotary surfaces so as to limit movement of such surfaces relative to said first surface, and means for measuring said forces to establish the shearing stress in said fluid at the two rates of shear.

3. Apparatus for measuring continuously viscosity of non-Newtonian fluid in a stream, comprising a casing having a chamber therein, a power-operated rotary member extending axially through said chamber and being rotated at a predetermined constant speed, two cylindrical sleeves of different internal diameter surrounding said rotary member in outwardly spaced concentric relation to said rotary member but in tandem with each other so that the annuli formed between said rotary member and the respective sleeves define portions of a continuous passageway through which fluid to be tested is subjected to a different rate of shear in each annulus, said casing having inlet and outlet means connected with opposite ends of said passageway for passing a stream of fluid through said passageway, means mounting each of said sleeves for at least a limited free turning movement in response to torque applied to such sleeves by the viscous forces developed in the fluid in each annulus under the rotating action of said rotary member, shiftable means engageable with said sleeve and operative to apply a force to each sleeve equal and opposite to the respective torques applied to each sleeve by the fluid, and means for measuring the forces applied by said shiftable means to said cylindrical sleeves for determining the torque applied by said fluid to said sleeves to establish the shearing stresses in said fluid at two rates of shear.

4. Apparatus for measuring continuously viscosity of non-Newtonian fluid in a stream, comprising a casing having a chamber therein, a power-operated rotary shaft extending axially through the chamber and being rotated at a predetermined constant speed, two axially spaced cylindrical sleeves of different internal diameter surrounding said shaft in outwardly spaced, concentric relation to said shaft and being mounted for free rotation about said shaft, a stationary sleeve disposed between said spaced sleeves and having an axially varying inner diameter tapering from the diameter of one cylindrical sleeve at its end adjacent said sleeve to the diameter of the other cylindrical sleeve at its end adjacent that sleeve so that the annuli formed between said shaft and said sleeves form a passageway free of sudden cross sectional change and through which fluid to be tested is passed under laminar flow conditions and at a different shear rate in each annulus, said casing having inlet and outlet means connected with opposite ends of said passageway for passing a stream of fluid through said passageway, abutment means on each of said cylindrical sleeves, and torque sensing members extending through said casing and into said chamber in position to be engaged by and to apply a force to the abutments on the respective sleeves equal and opposite to the torques applied to said sleeves by the fluid so as to limit movement thereof, and means for measuring the forces applied by said torque sensing members to said cylindrical sleeves for determining the torque applied by said fluid to said sleeves so as to establish thereby the shearing stresses in the fluid at the two rates of shear.

5. Apparatus as defined in claim 4 wherein said torque sensing members comprise fulcrumed levers each having a free end engageable by an abutment on a cylindrical sleeve, and said force measuring means includes means for measuring the moment exerted on said lever by said sleeve.

References Cited in the file of this patent

UNITED STATES PATENTS

| | | |
|---|---|---|
| 1,817,739 | Dintilhac | Aug. 4, 1931 |
| 2,410,385 | Loukomsky et al. | Oct. 29, 1946 |
| 2,773,507 | Norris | Dec. 11, 1956 |

FOREIGN PATENTS

| | | |
|---|---|---|
| 482,950 | Great Britain | Apr. 6, 1938 |